United States Patent [19]
Morrison

[11] 3,811,483
[45] May 21, 1974

[54] AUTOMATED SYSTEM AND METHOD FOR FILLING CONTAINERS WITH VISCOUS MATERIALS

[75] Inventor: David J. Morrison, Plainfield, N.J.

[73] Assignee: Schering Corporation, Bloomfield, N.J.

[22] Filed: Apr. 26, 1972

[21] Appl. No.: 247,549

Related U.S. Application Data

[63] Continuation-in-part of Ser. No. 142,270, May 11, 1971, abandoned.

[52] U.S. Cl............ 141/1, 83/199, 83/580, 141/264, 141/392, 222/80
[51] Int. Cl............ B65b 3/04, B65b 1/04
[58] Field of Search......... 141/1, 258–264, 141/280, 125, 392; 222/80, 342, 571, 522, 505; 83/199, 200, 580, 596

[56] References Cited
UNITED STATES PATENTS

| | | | |
|---|---|---|---|
| 3,162,219 | 12/1964 | Johnson et al. | 141/264 |
| 3,117,698 | 1/1964 | Canfield et al. | 141/264 |
| 3,267,971 | 8/1966 | Mueller | 141/264 |

*Primary Examiner*—Houston S. Bell, Jr.
*Attorney, Agent, or Firm*—Eric P. Schellin; Martin P. Hoffman

[57] ABSTRACT

Automated filling system including a reservoir, a motor and a rotary actuator supplying power to the system, a filler head, means for advancing the viscous material from the reservoir to the filler head, a rotatable cutting head depending from the filler head to (1) discharge viscous materials therethrough into a series of containers, and (2) cleanly sever the viscous materials after each container has been filled. The cutting head includes a first hollow tube that is open at its upper end and has a semicircular opening and a semicircular planar surface at its lower end, and a second, slightly larger hollow tube that is open at its upper end and has a semicircular cutting blade and a semicircular opening at its lower end. The tubes are concentrically mounted, and the rotary actuator periodically drives the tubes relative to each other. A thrust washer and resilient O-ring absorb axial movement of the tubes.

During the filling phase, the semicircular openings in the tubes are aligned so that the viscous material is forced into the container which may be held in a telescoping relationship to the tubes. At a predetermined point in the cycle of operation, the rotary actuator imparts relative rotation to the tubes so that the cutting blade cooperates with the planar surface to cleanly shear the viscous material.

15 Claims, 5 Drawing Figures

PATENTED MAY 21 1974 3,811,483

INVENTOR
DAVID J. MORRISON

BY *Schellin & Hoffman*
ATTORNEYS

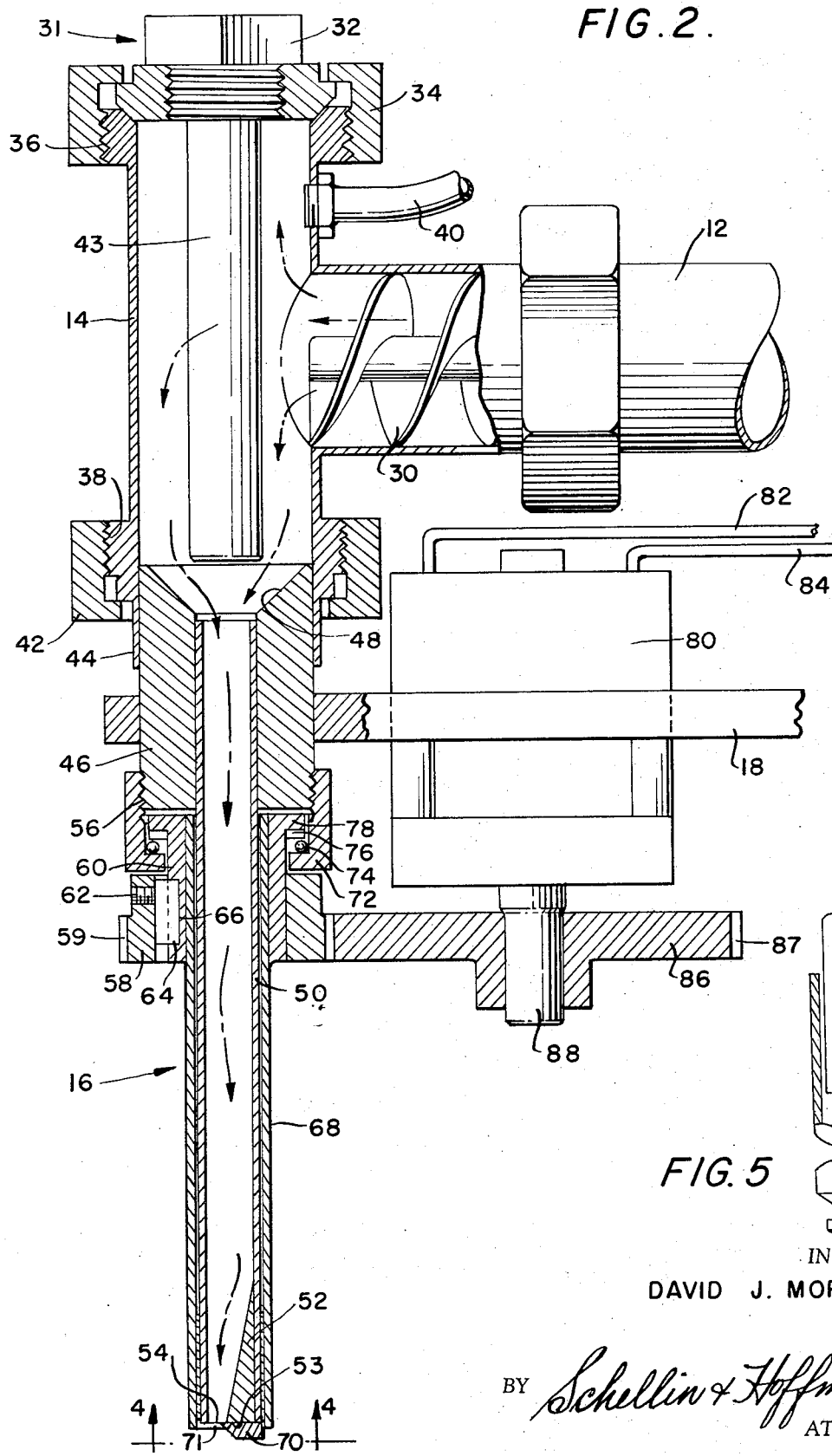

AUTOMATED SYSTEM AND METHOD FOR FILLING CONTAINERS WITH VISCOUS MATERIALS

RELATED APPLICATIONS

This application is a continuation-in-part of my previously filed co-pending application, Ser. No. 142,270, filed May 11, 1971, now abandoned and bearing the same title.

BACKGROUND OF THE INVENTION

1. Field of the Invention

The instant invention relates generally to automated systems, and related methods, for filling containers with viscous materials, and more particularly to unique, power-driven cutting heads employed within such system for shearing viscous materials after the completion of a filling operation.

2. Description of the Prior Art

The packaging industry has automatically filled containers of various sizes and shapes with predetermined quantities of semiliquids, such as pastes, creams, jellies, etc. for many years. U.S. Pat. Nos. 1,481,513 and 1,647,232, granted to Karl Kiefer, U.S. Pat. Nos. 1,676,734 and 1,828,865 granted to Nevil Hopkins, U.S. Pat. No. 1,700,405 granted to Guidi, and U.S. Pat. No. 2,110,328, granted to Wilhelm Drese, disclose but a few of the sundry machines and techniques employed with semiliquid, or low viscosity materials.

With the advent of consumer acceptance of new viscous and/or elastic materials, such as denture adhesives, silicon-based products, etc., known machines which relied upon gravity feed of the semiliquid material or upon creating a high velocity jet of the semiliquid material were found to be unequal to the task. While semiliquid materials could be pressurized to flow slowly, but smoothly, the more viscous materials exhibited a tendency to stick together in a taffy-like mass. Accordingly, after the container had been filled to the desired level, the viscous material had to be manually cut by an attendant with a pair of scissors or shears. Manifestly, this procedure was slow and expensive and defeated all attempts to design an efficient, mass-production, packaging facility.

Furthermore, even after being manually cut, an unsightly tail of viscous material was left on the open end of the container being filled. Such tail inhibited the subsequent sealing of the container particularly when a collapsible, thin, metallic tube was being filled and detracted from the attractiveness of the container to the consumer. The open ends of the tubes, which were filled in an upside down orientation were closed by rolling over or crimping the bottom layers of the tube.

SUMMARY

Thus, with the deficiencies of the prior art workers enumerated above clearly in mind, the invention contemplates an automated system for advancing viscous material from a reservoir through a unique cutting head that discharges the material and cleanly shears same at predetermined intervals, thus eliminating tailing while accurately filling the containers telescopically disposed thereupon. In the preferred embodiment, the system introduces air pressure into the reservoir to prevent the viscous material from congealing therein, and provides a recirculation line from the filler head to the reservoir to prevent excessive pressure buildup with the filler head. Suitable pressure fittings are employed so that the system can be pressurized without leakage, and the overlapping configuration at the bottom of the concentric tubes of the cutting head further contributes to the fluid tightness of the system. Thrust washers and O-rings within the cutting head allow limited axial movement to absorb surges in the pressurized product. Also the path that the pressurized product follows through the system is devoid of sharp corners where deposits of viscous material might accumulate and the system is readily disassembled for periodic servicing.

Other objects, advantages and desirable features of the instant invention will become apparent in light of the following description of the invention when construed in connection with the accompanying sheets of drawings.

DESCRIPTION OF THE DRAWINGS

FIG. 2 is a side elevational view of the pump filler head and cutting head of the filling system; such view is taken on an enlarged scale and with sections of the components broken away for the sake of clarity;

FIG. 5 is an elevational view, with portions broken away, showing a collapsible tube in telescoping relationship to the lower end of the cutting head.

DESCRIPTION OF THE INVENTION

Figure 1:
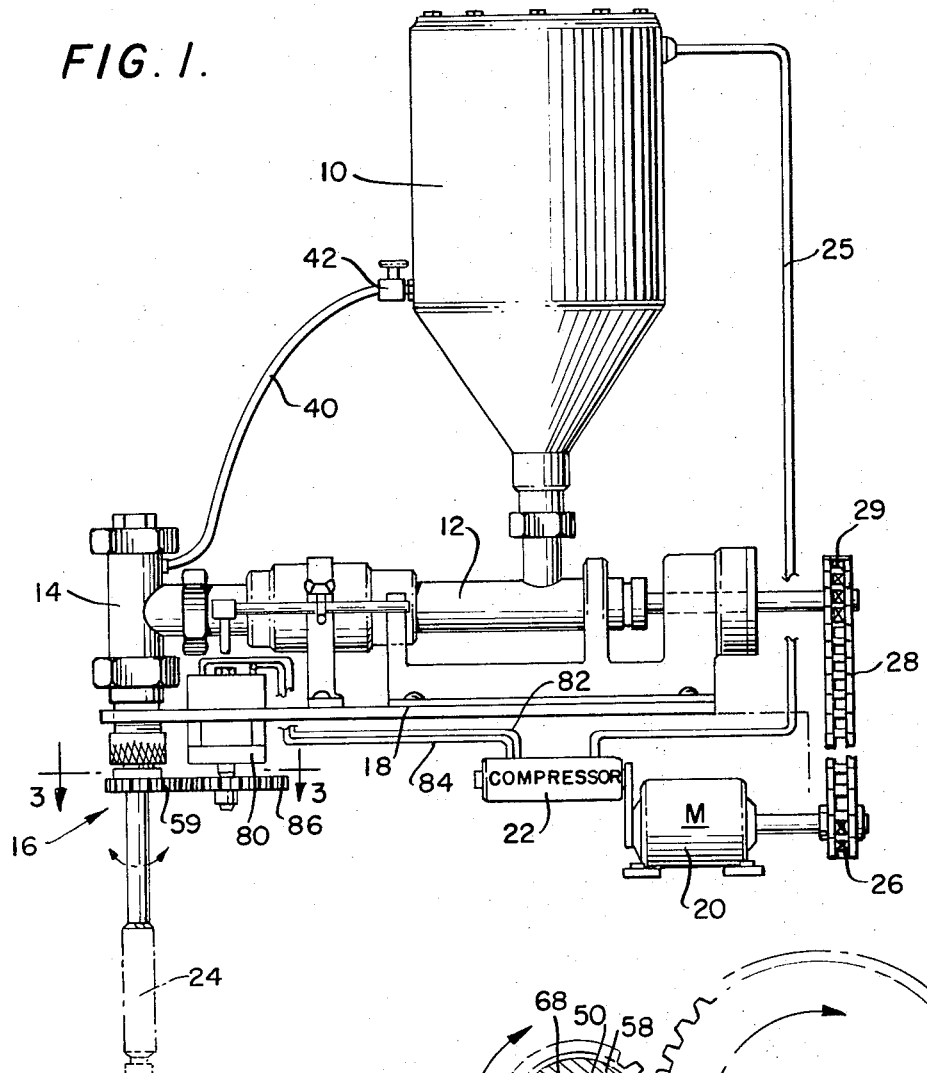
FIG. 1 is a side elevation of a filling system constructed in accordance with the principles of the instant invention.

Referring now in greater detail to the drawings in which similar reference numerals identify similar components, FIG. 1 depicts an automated filling system including a reservoir 10 with a conical lower portion, a pump 12, a filler head 14, and a cutting head, indicated generally by reference numeral 16. The system is mounted upon a table or similar planar surface 18 by suitable standards and brackets. Motor 20 is mounted below surface 18 and drives both compressor 22 and pump 12. A container to be filled, such as a collapsible tube 24, is shown in phantom outline below cutting head 16.

Pressurized air is supplied to reservoir 10 over conduit 25 from compressor 22 to prevent the supply of viscous material in the reservoir from congealing into a solid mass and to expedite the movement of the material downwardly into the entranceway of pump 12. Pump 12, which is driven from motor 20 via output gear or sprocket 26, chain drive 28 and sprocket 29, is a positive displacement pump. Although screw auger 30 is employed in the instant system as the positive displacement element for pump 12 to advance the viscous material from reservoir 10 to filler head 14, a reciprocable piston could be employed within pump 12 in lieu of screw auger 30.

FIG. 2 illustrates that filler head 14 is a hollow cylindrical member with a pressure fitting, indicated generally by reference numeral 31, screw threaded into sealing engagement with its upper end. Fitting 31 includes a cap 32 with a tapered base that is wedged into sealing engagement with the tapered surfaces at the upper end of head 14 as internally threaded nut 34 is advanced downwardly along exterior screw threads 36 at the upper end of the filler head. The lower end of head 14 is similarly exteriorly threaded, as indicated by reference numeral 38. A recirculation conduit 40 is connected to head 14 at a point intermediate the exit port from pump 14 and the upper screw threads 36; such conduit extends between head 14 and reservoir 10. A variable aperture valve 42 (see FIG. 1) is disposed in conduit 40 to control or regulate the return line pressure to the reservoir. As will become apparent hereinafter, conduit 40 and valve 42 relieve excessive pressure buildups within head 14. A cylindrical post 43 extends downwardly from cap 32 for guiding the viscous material through head 14 and inhibiting congealing.

Cutting head 16 is secured to exterior threads 38 on the lower end of head 14 and depends therebelow, as seen in FIGS. 1 and 2. Head 16 includes an internally threaded nut 42 that mates with threads 38 to seat the tapered surfaces on the top of sleeve 44 against the tapered surfaces at the bottom of head 14. A barrel 46 is secured to sleeve 44; the barrel, in turn, is secured to surface 18. An entranceway 48 which converges inwardly is formed at the upper end of the barrel and an elongated hollow tube 50, which is secured in fixed position, is secured within the barrel in communication with entranceway 48. A sloping wedge 52 which terminates in a planar surface 53 is situated at the lower end of tube 50. Surface 53 occupies an area equal to the area of the discharge opening 54 of tube 50 and the axial configuration of wedge 52 assists in routing the viscous material through opening 54. Exterior screw threads 56 are formed at the lower end of barrel 46.

Figure 3:
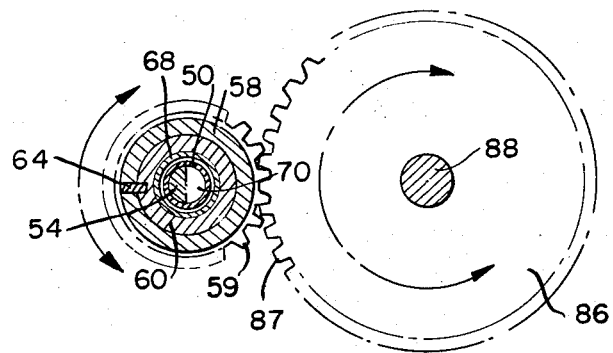
FIG. 3 is a top plan view of the gearing for oscillating the cutting head, such view being taken along line 3—3 in FIG. 1 and in the direction indicated.

As shown in FIGS. 2 and 3, cutting head 16 further includes a spur gear 58, with teeth 59, that is secured to sleeve 60 by screw 62 and key 64. Key 64 is received within recess 66 in sleeve 60 to insure proper alignment between gear 58 and sleeve 60. A hollow elongated tube 68, that is slightly larger than tube 50, is affixed to sleeve 60 and depends therebelow in concentric relationship to tube 50. Gear 58, sleeve 60 and tube 68 rotate or oscillate as a unit. A shearing blade 70 is located at the lower end of tube 68 and in proximity to the lower surface of wedge 52 in tube 50. Blade 70 is slightly greater in cross sectional area than the discharge opening 71 formed immediately adjacent thereto. Viscous material passes through the tubes when discharge openings 54 and 71 overlap, even partially. The degree of overlap determines the volume discharged per unit of time.

The unit formed by gear 58, sleeve 60 and tube 68 is secured to exterior threads 56 on barrel 46 by tension nut 72. A resilient-plastic O-ring 74 is positioned between thrust washer 76 on flange 78 on the upper end of sleeve 60 and the inner wall of tension nut 72. O-ring 74 and thrust washer 76 permit a limited degree of axial movement of tube 68 relative to tube 50 while allowing unrestricted rotative movement of tube 68 relative to tube 50.

Cutting head 16 is completed by a rotary pneumatic actuator 80 of conventional design. A solenoid with conventional control circuitry might be substituted for the pneumatic actuator, if so desired. Actuator 80 is secured to surface 18, and air pressure is supplied thereto from the high side of compressor 22 over conduit 82. The air is vented to atmosphere or to the low side of the compressor 22 over conduit 84. A spur gear 86, with teeth 87, is secured to the lower end of shaft 88 and constantly engaged with spur gear 58. Actuator 80, when pressurized, oscillates spur gear 86, and meshing spur gear 58, through an arc of 180°. Gear 58, sleeve 60 and the tube 68 also oscillate through an arc of 180° relative to tube 50, which is fixedly mounted.

Figure 4:
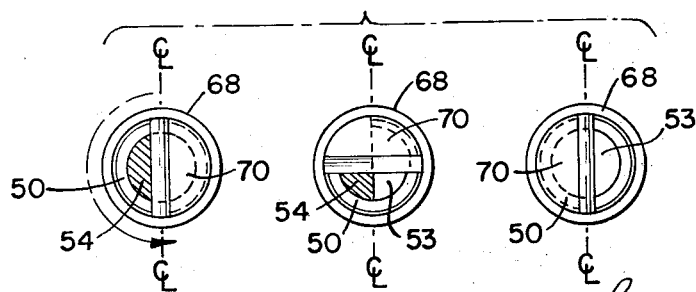
FIG. 4 is a schematic view of the progressive steps in the cycle of movement of the cutting head, such view being taken along line 4—4 in FIG. 2 and in the direction indicated.

FIG. 4 depicts schematically the progressive steps in which cutter blade 70 on outer tube 68 is oscillated relative to planar surface 53 on fixed inner tube 50 to cleanly sever the viscous material discharged from the inner tube. The view at the left of FIG. 4 represents the open position, wherein cutter blade 70 is located in overlapping relationship to surface 53 of wedge 52 in tube 50 (see FIG. 2, also). Opening 54, through which the discharge takes place is indicated by crosshatching. Blade 70 is slightly greater in horizontal dimension than the radius of outer tube 70 and thus extends beyond the center line of tubes 50 and 68.

The center view in FIG. 4 represents the half open position at which point only half of discharge opening 54 in inner tube 50 is open. Actuator 80 has rotated cutter blade 70 through a 90° turn in the counterclockwise direction and wedge 52 in tube 50 blocks the right-hand half of the tube. The sharp leading edge of blade 70 cooperates with fixed planar surface 53 to gradually shear the pressurized mass as the blade is rotated.

The view at the right of FIG. 4 represents the closed position at which point blade 70 covers aperture 54 in tube 50 after completely shearing through the viscous mass. As previously noted, the leading edge of blade 70 extends beyond the center line of the tubes and overlaps the inner bottom edge of surface 53 on wedge 52. This overlapping relationship enhances the sealing relationship between the tubes and prevents pressurized material from escaping between wedge 52 and blade 70, despite the substantial pressure to which the material is subjected.

FIG. 5 depicts the spatial relationship between coacting tubes 58, 60 and the collapsible tube 24 being filled. The open bottom end of the tube is inverted and telescoped over the lower end of the cutting head so that the severing of the viscous material occurs completely within the confines of the tube at a predetermined axial distance from its bottom edge. Hence, there will be no viscous tail to soil the exterior of the tube and to interfere with the rolling and crimping operations for completing the finished package.

CYCLE OF OPERATION

The cycle of operation of the filling system is briefly summarized in the following manner. With motor 20 and compressor 22 turned on, the viscous material for filling collapsible tubes 24 is fed into reservoir 10. Reservoir 10, with the assistance of pressurized air supplied via conduit 28, discharges the viscous material into positive displacement pump 12 which advances the material under considerable pressure into filler head 14.

Tests have shown that the pressure on the viscous material in head 14 can reach levels ranging from 200–500 pounds per square inch when the discharge from head 14 is blocked for any reason. In order to prevent blowing the pressure fittings throughout the system, recirculation conduit 40 with variable orifice valve 42 acts as a bypass to return viscous material to reservoir 10 (see FIG. 1).

As shown by the directional arrows in FIG. 2, the pressurized viscous product discharged from pump 12 moves around post 43, through filler head and then downwardly into fixed inner tube 50. Tapered wedge 52 routes the material toward discharge opening 54. After the desired quantity of material has been forced into container 24, which is preferably retained in telescoping relationship to the lower end of cutting head 16 (see FIG. 5), actuator 80 is energized and spur gear 86 is rotated or oscillated in a 180° arc. Teeth 87 on gear 86 mesh with teeth 59 on adjacent gear 58 and thus rotate outer tube 68 relative to fixed inner tube 50 (see FIG. 3). Cutter blade 70 at the lower end of tube 68 cooperates with planar surface 53 on tube 50 to shear the viscous mass as the blade is rotated.

Resilient O-ring 74 and thrust washer 76 allow a limited amount of axial movement of tube 68 relative to tube 50, thereby absorbing the pressure without damaging the system. After filled container 24 has been removed and a new container repositioned beneath discharge aperture 54 in telescoping relationship to cutting head 16, actuator 80 oscillates gear 86 in a 180° arc in the reverse direction to fully uncover aperture 54. The cycle is then repeated.

ALTERNATIVE EMBODIMENTS

While the preferred embodiment relies upon rotation of the outer tube relative to the inner tube, the inner tube could easily be mounted for rotational movement relative to the outer tube. Furthermore, if so desired, both tubes could be mounted for rotational movement at different points in the cycle of operation so that the net result of relative rotational movement would be achieved. Wedge 52 might be omitted, and only a semicircular plate might be secured to the lower end of tube 58.

Additionally, recirculation conduit 40 could be replaced by a slip-clutch of conventional design interposed in the filling system between motor 20 and pump 12, and an axial extension of the outlet from pump 12 could eliminate post 43 in filler head 14. Alternatively, the viscous material could be advanced through the system solely by an auger without resorting to pressurizing such material, and packages of all sizes and shapes can be filled advantageously. Similarly, actuator 80 and associated gear 86 could be replaced by a reciprocating actuator connected to a rack gear, or by a hydraulic piston connected directly to a rack gear or the like. Gear 58 could be welded directly to tube 68, if so desired thereby obviating the need for key 64 and recess 66. Numerous other modifications can be made within the filling system without violating the inventive concepts expressed above.

What is claimed is:

1. A method of severing viscous material with a cutting head comprising a first and second tube, each one of said tubes being completely open at its upper end and at least partially open at its lower end to define a discharge opening, one of the tubes having cutting means secured to its lower end adjacent its discharge opening, said method including the steps of:
   a. positioning the tubes in concentric relationship to each other,
   b. advancing the viscous material so that it moves through the interior of the concentric tubes until exiting through the discharge openings, and
   c. rotating the tubes relative to each other so that the cutting means shears the viscous material exiting through the discharge openings.

2. An automated system for filling containers with viscous material comprising:
   a. a reservoir for receiving viscous material,
   b. a pump having an inlet and an outlet, said inlet being connected to said reservoir for pressurizing the viscous material before discharging same through said outlet,
   c. a filler head having an inlet and an outlet, said inlet being connected to the outlet of said pump,
   d. a cutting head connected to the outlet of said filler head, said cutting head including
      1. a first and a second tube mounted in concentric relationship,
      2. each one of said tubes being completely open at its upper end and partially open at its lower end for discharging the viscous material,
      3. one of said tubes having a shearing blade secured to its lower end,
      4. the other one of said tubes having a planar surface at its lower end, and
   e. power means for driving said pump and for moving said tubes relative to each other so that said shearing blade cooperates with said planar surface to sever the viscous material as it passes through the openings in the lower ends of said tubes.

3. An automated system as defined in claim 2 further including means for relieving excessive pressure buildup within said filler head.

4. An automated system as defined in claim 2 further including a conduit connected to said reservoir, and said power means includes a compressor, said compressor connected via said conduit to said reservoir for supplying same with pressurized fluid to assist the movement of the viscous material.

5. A cutter head for shearing viscous material comprising:
   a. a first hollow tube having an open upper end and a discharge opening extending partially across its lower end,
   b. a second larger hollow tube having an open upper end and a discharge opening extending partially across its lower end,
   c. means for mounting said tubes in concentric relationship,
   d. said first tube having a planar surface located adjacent to its discharge opening,
   e. power means for rotating said tubes relative to one another, and
   f. cutting means situated adjacent to the discharge opening in said second tube, said cutting means cooperating with said planar surface for shearing the viscous material passing through the discharge openings in the concentric tubes.

6. A cutter head as defined in claim 5 further including a tapered wedge extending axially toward the lower end of the first hollow tube for routing the viscous material toward the discharge opening.

7. A cutter head as defined in claim 6 wherein the lower end of the wedge terminates in said planar surface, said surface being semicircular in configuration when seen in plan view and equal in area to the discharge opening at the lower end of said first hollow tube.

8. A cutter head as defined in claim 5 wherein said cutting means comprises a blade of substantially semicircular-configuration when seen in plan view, said blade tapering in side elevation to a sharp leading edge, said edge extending slightly over the center line of said second tube.

9. A cutter head as defined in claim 5 wherein said power means comprises a rotary actuator, a first gear, a rotary actuator for driving said first gear, and a second gear, said second gear being secured to said second tube and in meshing engagement with said first gear to be driven thereby.

10. A cutter head as defined in claim 5 wherein said means for mounting said tubes in concentric relationship includes a sleeve secured to the exterior of said second tube for movement in concert therewith, a recess in said sleeve, and a key that extends into said recess.

11. A cutter head as defined in claim 10 wherein said means for mounting said tubes in concentric relationship further includes a barrel for supporting said first tube, screw threads formed on the exterior of said barrel, a tension nut mating with said screw threads, and a thrust washer and O-ring disposed within said nut to be pressed against said sleeve as said nut is advanced, said thrust washer and O-ring permitting limited axial movement between said tubes.

* * * * *

UNITED STATES PATENT OFFICE
CERTIFICATE OF CORRECTION

Patent No. 3,811,483        Dated May 21, 1974

Inventor(s) David J. Morrison

It is certified that error appears in the above-identified patent and that said Letters Patent are hereby corrected as shown below:

Claim 1 should appear as shown below:

1. A method of severing viscous material with a cutting head comprising a first and a second tube, each one of said tubes being completely open at its upper end and partially open at its lower end to define a discharge opening, one of the tubes having a shearing blade secured to its lower end adjacent its discharge opening, the other one of the tubes having a planar surface adjacent its discharge opening at its lower end, said method including the steps of:

a) positioning the tubes in concentric relationship to each other, b) advancing the viscous material so that it moves through the interior of the concentric tubes until exiting through the discharge openings, and c) rotating the tubes relative to each other so that the shearing blade cooperates with the planar surface to

UNITED STATES PATENT OFFICE
CERTIFICATE OF CORRECTION

Patent No. 3,811,483                Dated  May 21, 1974

Inventor(s)  David J. Morrison                Page - 2

It is certified that error appears in the above-identified patent and that said Letters Patent are hereby corrected as shown below:

shear the viscous material exiting throuth the discharge openings.

Signed and sealed this 12th day of November 1974.

(SEAL)
Attest:

McCOY M. GIBSON JR.　　　　　　　　C. MARSHALL DANN
Attesting Officer　　　　　　　　　　Commissioner of Patents